(12) United States Patent
Werner et al.

(10) Patent No.: US 8,254,787 B2
(45) Date of Patent: Aug. 28, 2012

(54) PMDC FEEDBACK ARRANGEMENT FOR APOL-DPSK

(75) Inventors: Dieter Werner, Neunkirchen am Brand (DE); Chongjin Xie, Morganville, NJ (US)

(73) Assignee: Alcatel Lucent, Paris (FR)

( * ) Notice: Subject to any disclaimer, the term of this patent is extended or adjusted under 35 U.S.C. 154(b) by 612 days.

(21) Appl. No.: 12/411,436

(22) Filed: Mar. 26, 2009

(65) Prior Publication Data

US 2010/0247109 A1 Sep. 30, 2010

(51) Int. Cl.
 *H04B 10/12* (2006.01)
 *H04B 10/00* (2006.01)
(52) U.S. Cl. ..................................... 398/147
(58) Field of Classification Search .................. 398/147
 See application file for complete search history.

(56) References Cited

U.S. PATENT DOCUMENTS

2011/0182572 A1* 7/2011 Klekamp et al. ................ 398/25

OTHER PUBLICATIONS

Axel Klekamp et al., "Comparisons on PMD-Compensation Feedback Signals for Bit-to-Bit Alternate-Polarization RZ-DPSK," Optical Fiber Comm. Conf. (OFC), San Diego, CA, No. 0ThF5, Mar. 22, 2009, pp. 1-3.
Chongjin Xie et al., "Polarization-Mode-Dispersion Compensator Feedback Signal for Alternate-Polarization Return-to-Zero Differential-Phase-Shift-Keying Signals," Optical Fiber Comm.-Includes Post Deadline Papers, OFC 2009, Conf. On, IEEE, Piscataway, NJ, Mar. 22, 2009, pp. 1-3.
Yannick Keith Lize et al., "Independent and Simultaneous Monitoring of Chromatic and Polarization-Mode Dispersion in OOK and DPSK Transmission," IEEE Photonics Tech. Letters, Piscataway, NJ, vol. 19, No. 1, Jan. 1, 2007, pp. 3-5.
Yannick Keith Lize et al., "Simultaneous and Independent Monitoring of OSNR, Chromatic and Polarization Mode Dispersion for NRZ-OOK, DPSK and Duobinary," Optical Fiber Comm. Conf., OFCNFOEC 2007, Mar. 25-29, 2007, IEEE, Piscataway, NJ, Mar. 1, 2007, pp. 1-3.
H. Rosenfeldt et al., Automatic PMD Compensation at 40 Gbit/s and 80 Gbit/s Using a 3-Dimensional DOP Evaluation for Feedback, Optical Society of America, 2001.

* cited by examiner

*Primary Examiner* — Dawayne A Pinkney
(74) *Attorney, Agent, or Firm* — Brosemer, Kolefas & Assoc. LLC

(57) ABSTRACT

Methods and apparatus are provided for optical polarization mode dispersion compensator (PMDC) feedback control for APol-DPSK signals. A feedback signal generator includes a delay-line-interferometer (DLI), with a differential delay line delay (D) different from one bit period (Tb). In an exemplary embodiment, the DLI delay is in the range of 0.5 Tb<D<1.0 Tb, or 1.0 Tb<D<1.5 Tb, preferably 0.85 Tb or 1.15 Tb. The DLI is coupled to a single-ended detector, whose output is amplified and bandpass filtered around the frequency of half the bit rate. The filtered signal is then applied to an RF power detector to generate the PMDC feedback signal. Generation of the PMDC feedback signal in accordance with the present invention is insensitive to any alignment of the state of polarization (SOP) of the received APol-DPSK signal with the principal state of polarization (PSP) of the transmission link. As a result, there is no need for a polarization scrambler at the transmitter. Additionally, by dispensing with the polarization scrambler at the transmitter, systems in accordance with the present invention can be implemented with reduced complexity and cost and improved performance.

17 Claims, 6 Drawing Sheets

PMDC FEEDBACK ARRANGEMENT FOR APOL-DPSK

FIELD OF INVENTION

The present invention relates to the field of optical communications, and more specifically to apparatus and methods relating to polarization mode dispersion compensation.

BACKGROUND

Alternate-polarization (APol) modulation of optical signals, in which adjacent bits are orthogonally polarized, can significantly increase system tolerance to fiber nonlinearities in pseudo-linear transmission. APol return-to-zero (RZ) differential-phase-shift-keying (DPSK) has been shown to have the highest tolerance to fiber nonlinearities and is considered a promising candidate for 40-Gb/s submarine systems. Compared to a single polarization signal, however, an APol signal has a reduced tolerance to polarization mode dispersion (PMD). For an APol signal, there is no input state of polarization (SOP) that does not cause at least some distortion by even first-order PMD. Moreover, PMD impairments are almost independent of input SOP. To increase the PMD tolerance of an APol signal, PMD compensation is employed. A PMD compensator (PMDC) is typically provided at an optical receiver and is controlled in a feedback arrangement in accordance with a feedback signal generated by some means for detecting PMD.

Some widely used PMDC feedback signals, such as degree of polarization (DOP) and RF tones, do not work for an APol signal. The DOP of an APol signal is close to zero even when there is no PMD, and the relationship of RF tones to PMD is different for different input SOPs. Although eye-opening monitoring and bit error rate (BER) after forward error correction (FEC) can be used as feedback, such arrangements require a fully functional receiver and are not cost effective for a standalone PMDC. Moreover, the speed of such arrangements is limited as well.

Some PMD compensation arrangements require a polarization scrambler at the transmitter. (See, e.g., H. Rosenfeldt et al., "Automatic PMD Compensation at 40 Gbit/s and 80 Gbit/s Using a 3-Dimensional DOP Evaluation for Feedback," Optical Fiber Communication Conference, 2001.) The use of a polarization scrambler, however, introduces cost, reliability and complexity issues.

SUMMARY

Methods and apparatus are provided for the feedback control of polarization mode dispersion (PMD) compensation of optical APol-DPSK signals, which methods and apparatus do not require the polarization of the signals to be scrambled upon transmission. Further, a PMDC feedback arrangement for Apol-DPSK that does not require a polarization scrambler at the transmitter is also provided.

An exemplary embodiment of the present invention includes a delay-line-interferometer (DLI), with a differential delay (D) between the two arms different from one bit period (Tb). In one exemplary embodiment, the DLI delay D is in the range of 0.5 Tb<D<1.0 Tb, or 1.0 Tb<D<1.5 Tb, preferably 0.85 Tb or 1.15 Tb. The DLI is coupled to a single-ended detector whose output is amplified and bandpass filtered around the frequency of half the bit rate. The filtered signal is then applied to an RF power detector to generate the PMDC feedback signal.

Generation of the PMDC feedback signal in accordance with an embodiment of the present invention is insensitive to any alignment of the state of polarization (SOP) of the received APol-DPSK signal with the principal state of polarization (PSP) of the transmission link. As a result, there is no need for a polarization scrambler at the transmitter. Additionally, by dispensing with the polarization scrambler at the transmitter, systems implemented in accordance with the present invention can be implemented with reduced complexity and cost.

The aforementioned and other aspects, features and benefits of embodiments of the present invention will be apparent from the figures and description which follow.

BRIEF DESCRIPTION OF FIGURES

Some embodiments of apparatus and/or methods in accordance with embodiments of the present invention are now described, by way of example only, and with reference to the accompanying figures in which.

DESCRIPTION OF EMBODIMENTS

Figure 1:
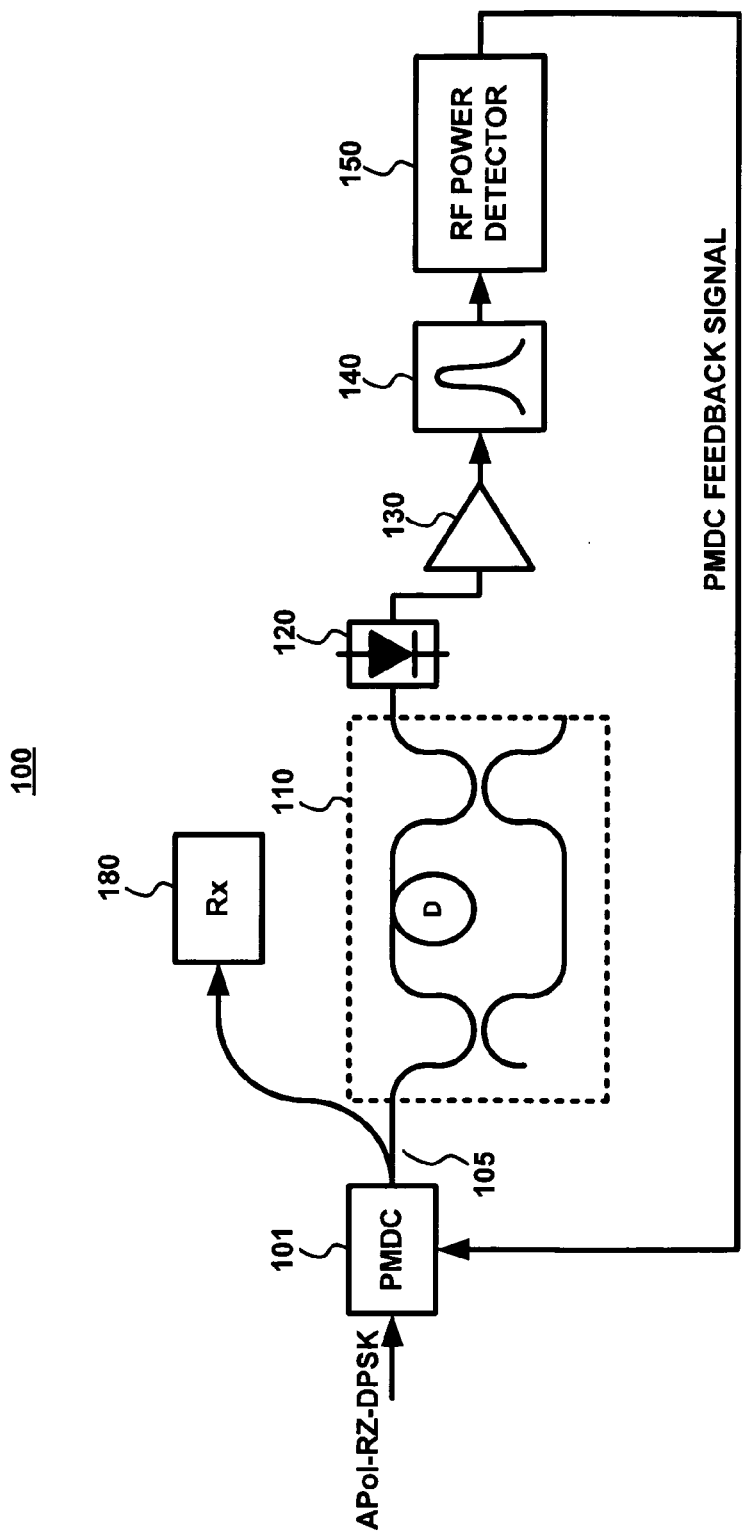
FIG. 1 is a schematic representation of a first exemplary embodiment of a polarization mode dispersion compensator (PMDC) feedback arrangement in accordance with the present invention.

FIG. 1 is a schematic representation of an exemplary embodiment of a polarization mode dispersion (PMD) compensation feedback arrangement 100. Shown in the arrangement 100 are a PMD compensator (PMDC) 101, a coupler 105, a delay-line-interferometer (DLI) 110, a photo-detector 120, an RF amplifier 130, a bandpass filter (BPF) 140, an RF power detector 150, and an optical receiver 180, each of which can be implemented in known ways.

An alternate-polarization (APol) return-to-zero (RZ) differential-phase-shift-keying (DPSK) optical signal is provided to the PMDC 101 which is controlled by a PMDC feedback signal—generated as described below—to compensate for PMD in the APol-RZ-DPSK optical signal. The PMD-compensated APol-RZ-DPSK signal is provided to the coupler 105, which taps-off part of the signal to an input of the DLI 110, and the remainder to the optical receiver 180. A typical value for the tap ratio is 10%, but this value could be much more or less (e.g., ~1-90%) depending on a variety of factors such as, for example, implementation and the expected optical power at the input of the coupler 105.

The DLI 110 demodulates the signal to generate a demodulated optical signal whose intensity varies in accordance with the phase of the original DPSK signal. The photo-detector 120 can be coupled to the constructive or destructive port of the DLI 110 to convert the demodulated optical signal, or its complement, to its electrical signal equivalent.

Note that while the exemplary embodiment shown is described for use with APol-RZ-DPSK signals, the present invention can be applied to non-return-to-zero (NRZ) signals as well. Moreover, DPSK may refer to any differential phase-shift-keying modulation format, including, for example, DBPSK, DQPSK, and Dm-PSK, among others, as well as DPSK formats combined with other modulation schemes, such as, for example, DPSK with amplitude shift keying (DPSK+ASK), among others.

The output of the photo-detector 120 is coupled to the input of the RF amplifier 130 whose output is coupled to the BPF 140 whose output is, in turn, coupled to the input of the RF power detector 150. The electrical signal is amplified by the RF amplifier 130, filtered by the BPF 140, and then detected by the RF power detector 150 to generate a feedback signal to control the PMD compensator 101. As can be appreciated, the gain to be provided by the RF amplifier 130 will depend on the electrical signal level out of the detector 120 and the sensitivity of the RF power detector 150 and/or of the BPF 140. Given suitable signal levels and sensitivities, the amplifier 130 can be eliminated. Additionally, as can be appreciated, the detector 120, RF amplifier 130, BPF 140 and RF power detector 150 can be implemented as separate components or combined into one or more components.

In a typical implementation, the RF power detector 150 will generate an output signal whose level is proportional to the log of the RF power detected. Depending on the implementation, this analog signal could be provided to the PMDC 101 or it may be converted to digital format by an analog-to-digital converter (A/D) and further processed, for example, by a digital signal processor (DSP) or a field programmable gate array (FPGA). In any case, as can be appreciated by those of ordinary skill in the art in light of the present disclosure, the feedback loop should be fast enough to react to fast changes in the PMD, which may occur. Therefore fast electronics should be used as well as an efficient control algorithm and time-efficient implementation of the control algorithm in the DSP or FPGA.

In an exemplary embodiment, for an APol-RZ-DPSK input signal with a bit rate R of 42.7 Gb/s, the DLI 110 has a free spectral range (FSR) of approximately 50 GHz. The 42.7 Gb/s bit rate corresponds to a bit period Tb of approximately 23.5 ps and the 50 GHz FSR corresponds to a DLI delay D (i.e., the difference in delays through the two arms of the DLI) of approximately 20.0 ps. As such, the ratio D/Tb (or equivalently R/FSR) is approximately 0.85 for this exemplary embodiment. As discussed in greater detail below, the ratio D/Tb (and thus R/FSR) preferably has a value different from 1.0.

The photo-detector 120 preferably has a bandwidth greater than approximately R/2, or approximately 21.35 GHz in this case. In an exemplary embodiment, the photo-detector 120 has a bandwidth of at least 20 GHz. The BPF 140 passes a band of frequencies that includes half the bit rate (R/2), or approximately 21.35 GHz in this case, with a bandwidth selected so that the detected RF power level preferably will be substantially independent of the state of polarization (SOP) of the optical APol-DPSK input signal. The passband of the BPF 140 may or may not be centered at approximately R/2, so long as R/2 falls within the passband. As discussed below in greater detail, in a 42.7 Gb/s exemplary embodiment, the bandwidth of the BPF 140 is preferably approximately 3.4 GHz.

Figure 2:
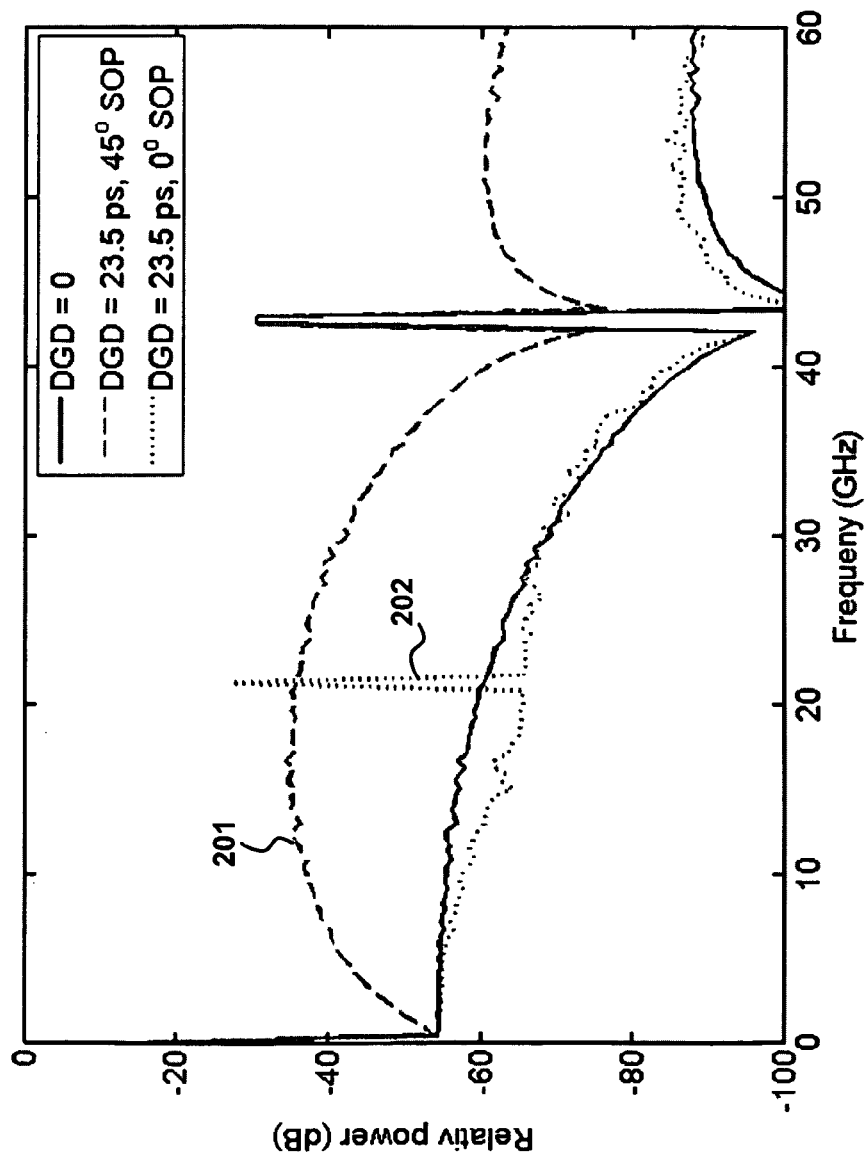
FIG. 2 shows plots of electrical signal level over frequency for the feedback signal generator of FIG. 1 for different states of polarization (SOP), with and without polarization mode dispersion (PMD)

FIG. 2 shows illustrative plots of electrical signal level over frequency for the feedback signal generator of FIG. 1 for different SOPs, with and without polarization mode dispersion (PMD). As shown by plot 201, when the SOP of the APol-RZ-DPSK input signal is 45 degrees, due to interference between the signals combined at the output coupler of the DLI 110, the RF power at the output of the detector 120 will be high when there is PMD (e.g., differential group delay (DGD) of 23.5 ps). When the SOP is 0 (or 90) degrees, there is no interference at the output coupler of the DLI 110, but as the DLI 110 has a differential delay that is not exactly one bit period, the RF tone at the frequency of half the bit rate (e.g., 21.35 GHz) is large when there is PMD, as shown by plot 202. Therefore, the output of the RF power detector 150, which is representative of the RF power around half of the bit rate frequency, provides an effective PMDC feedback signal.

Figure 3:
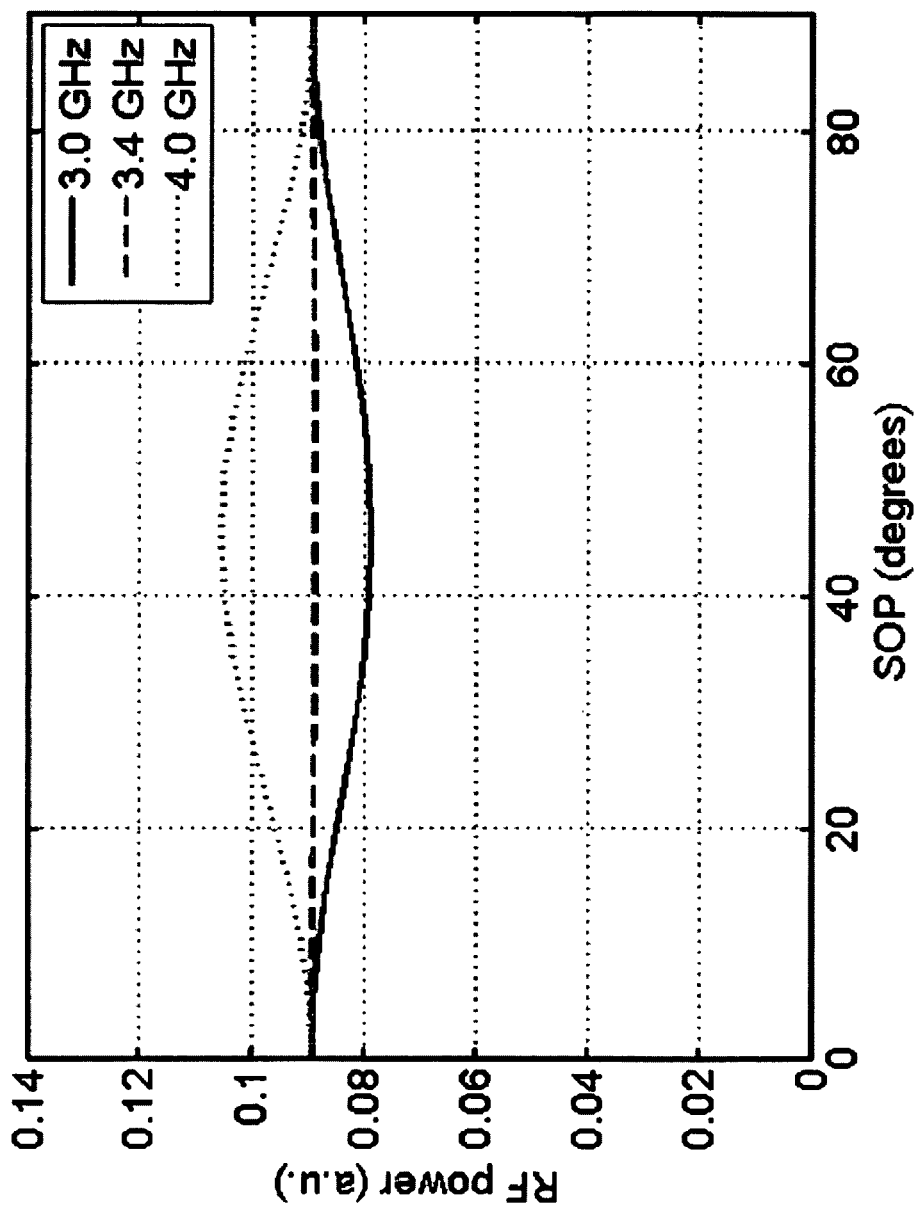
FIG. 3 shows RF power level relative to SOP for the feedback generator of FIG. 1 for different detection bandwidths.

FIG. 3 shows plots of the detected RF power level with respect to SOP for the feedback signal generator of FIG. 1 (with a DLI delay to bit period ratio (D/Tb) of approximately 0.85) for different detection bandwidths (3.0, 3.4 and 4.0 GHz). In the plots shown, ideal bandpass filtering is assumed. As can be appreciated, for actual implementations, the detection bandwidth will depend on the shape of the detection bandwidth passband. The detection bandwidth is determined primarily by the BPF 140, but may also be affected by the detector 120, RF amplifier 130 and the RF power detector 150. For the plots shown, the PMD compensated is characterized by a differential group delay (DGD) of 23.5 ps, or approximately one bit period of the 42.7 Gb/s APol-RZ-DPSK signal. As can be seen, a detection bandwidth of approximately 3.4 GHz provides the flattest response over the range of SOPs so that the feedback signal generated will be substantially SOP-independent.

Figure 4:
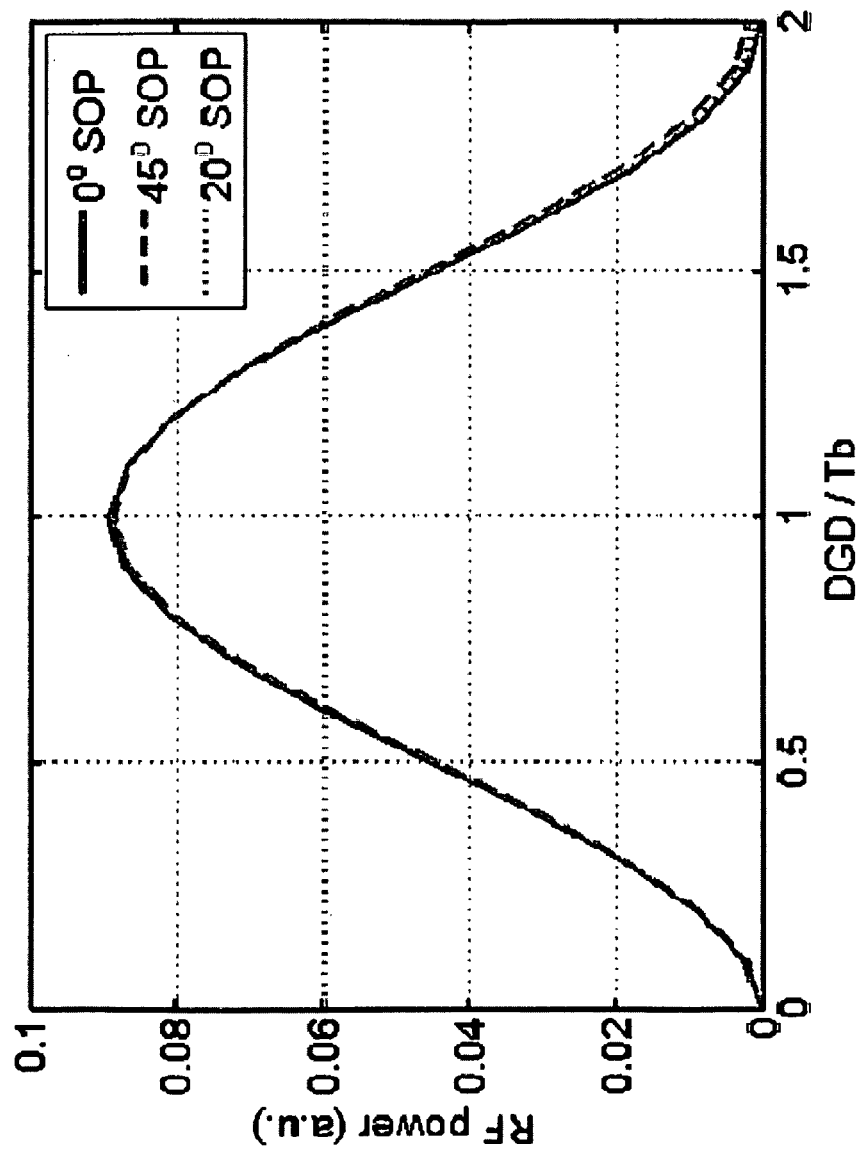
FIG. 4 shows RF power level relative to differential group delay (DGD) for the feedback generator of FIG. 1 for different SOPs.

FIG. 4 shows plots of the detected RF power level relative to differential group delay (DGD) for the feedback generator of FIG. 1 (D/Tb≈0.85) for different SOPs (0, 20 and 45 degrees). As FIG. 4 illustrates, a DGD of approximately one bit period Tb yields the greatest RF power level. In other words, the DGD detection range is approximately one bit period. This should be sufficient if the target of the PMDC is an average DGD, for example, of approximately 6 ps or less for a 42.7 Gb/s signal.

In accordance with the present invention, the DLI delay D (i.e., the difference in delays through the two arms of the DLI) is preferably selected to be different from one bit period Tb. In an exemplary embodiment, the DLI delay D is selected to be within the ranges of:

$$0.5\ Tb < D < 1.0\ Tb,\ or$$

$$1.0\ Tb < D < 1.5\ Tb,$$

preferably 0.85 Tb or 1.15 Tb. As can be appreciated, for multi-bit DPSK formats (e.g., DQPSK) in which a symbol represents more than one bit of information, the relevant time period for purposes of the aforementioned ranges will be the symbol period (Ts).

Figure 5A:
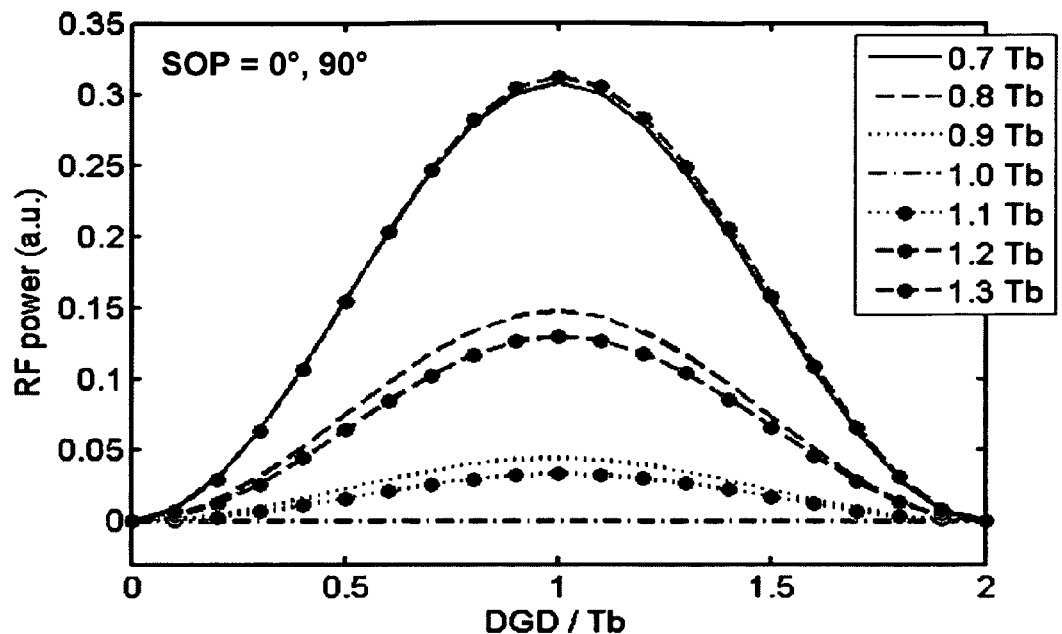
FIGS. 5A and 5B show RF power level relative to DGD for the feedback generator of FIG. 1 for different delay-line-interferometer delays, for SOPs of 0 and 45 degrees, respectively.
Figure 5B:
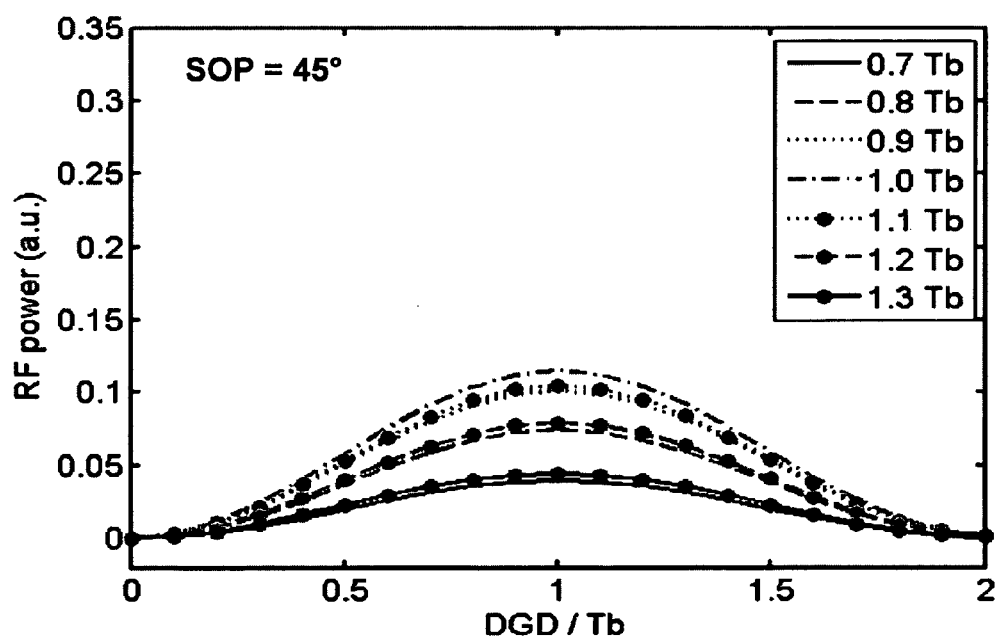

The influence of the DLI delay on the performance of the feedback generator of FIG. 1 can be appreciated with reference to FIGS. 5A and 5B. These figures show plots of the detected RF power level relative to DGD for different DLI delays, for SOPs of 0 (or 90) and 45 degrees, respectively. Note that where the DLI delay is equal to 1.0 Tb, the output level is minimal when the SOP is 0 or 90 degrees (FIG. 5A), but significant when the SOP is 45 degrees (FIG. 5B). In other words, if the SOP of the received APol-DPSK signal is aligned with the principal state of polarization (PSP) of the transmission link, an implementation in which the DLI delay is equal to 1.0 Tb will not generate a significant feedback signal, even in the presence of PMD. For such an implementation, a polarization scrambler could be used at the transmitter to ensure SOP/PSP misalignment. In addition to cost, reliability and complexity issues, use of a polarization scrambler, however, slows down and complicates the generation of the feedback signal because several SOPs of the Apol-DPSK signal should be received and processed in order to generate a valid feedback signal.

Note in FIGS. 5A and 5B, however, that for DLI delay values of 1.3 Tb and 0.7 Tb, the output levels are substantially higher, particularly for the SOP of 0 (or 90) degrees (FIG. 5A). Delay values of 0.85 Tb and 1.15 Tb, corresponding to FSRs of 50 GHz and 37 GHz, respectively, are appropriate as these would yield good output levels for SOPs of 0 (or 90) as well as 45 degrees.

Figure 6:
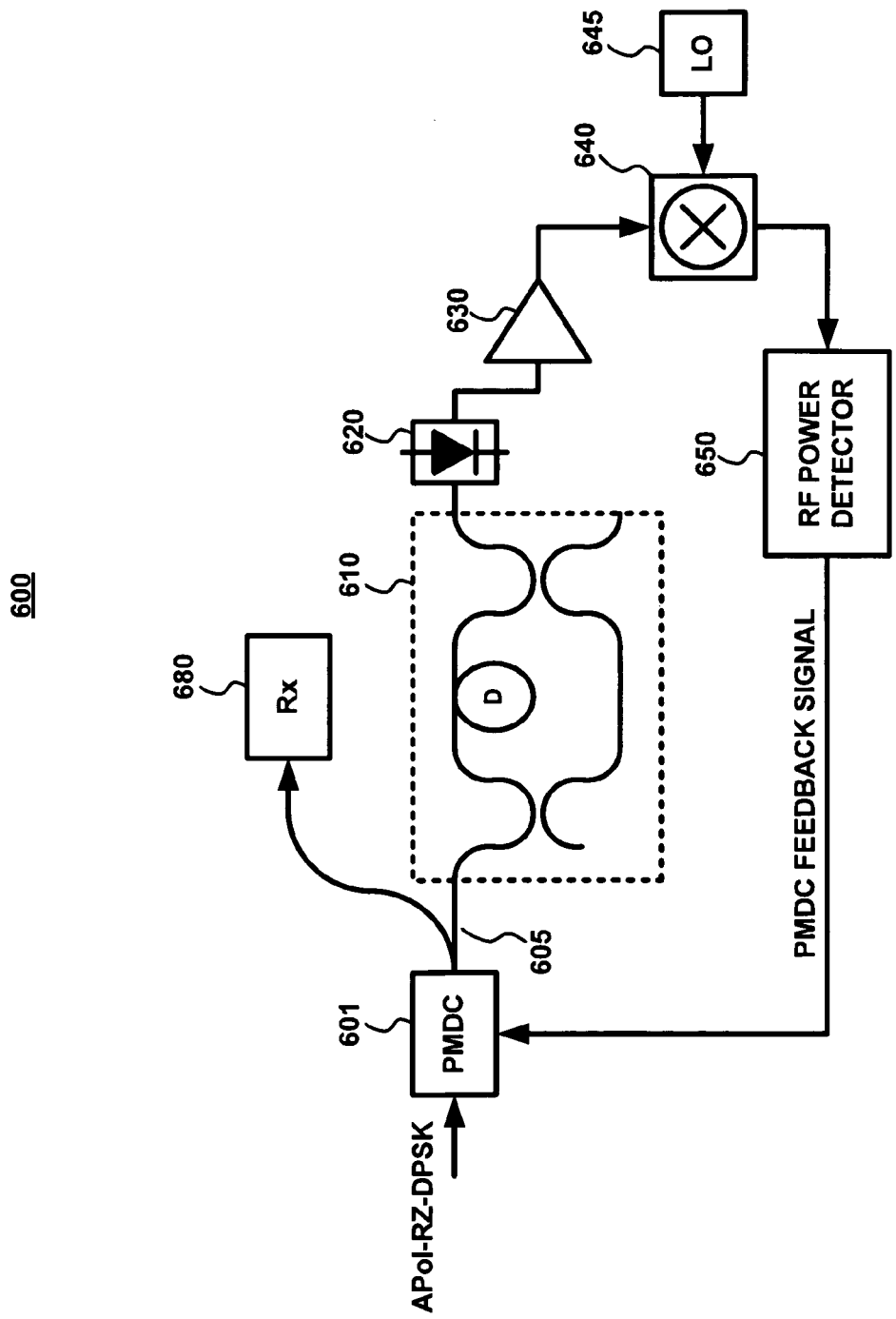
FIG. 6 is a schematic representation of a second exemplary embodiment of a PMDC feedback arrangement in accordance with the present invention.

FIG. 6 shows a further exemplary embodiment of a PMDC feedback arrangement 600 in accordance with the present invention. A 42.7 Gb/s APol-RZ-DPSK optical input signal is provided to PMD compensator (PMDC) 601 which is controlled by a PMDC feedback signal generated as described below. The PMD-compensated APol-RZ-DPSK signal is provided to a coupler 605, which taps-off part (~1-90%) of the signal to an input of a DLI 610, and the remainder to an optical receiver 680. The DLI 610 has an FSR selected as described above (e.g., approximately 50 GHz, with a delay D of approximately 0.85 Tb.) A photo-detector 620 with a bandwidth larger than approximately R/2 is used to convert the optical signal from the constructive or destructive port of the DLI 610 to its representative electrical signal. After amplification by RF amplifier 630, the electrical signal is mixed at 640 with a local oscillator (LO) 645 to down-convert the signal to a low frequency range (e.g., approximately 1-5 GHz or less). The down-converted signal is then detected by an RF power detector 650. The output from the RF power detector 650 is used as the feedback signal to control the PMDC 601.

In the embodiment of FIG. 6, the detection bandwidth is determined primarily by the RF power detector 650. The RF power detector 650 may, for example, have a BPF incorporated in its input or otherwise have input characteristics that provide the appropriate bandpass filtering. Alternatively, analogously to the embodiment of FIG. 1, a separate BPF (not shown) can be arranged between the mixer 640 and the RF power detector 650, to provide bandpass filtering. Moreover, as can be appreciated, the selection of the passband of the detection bandwidth will depend on the frequency of the LO 645. In other words, the passband of the detection bandwidth is preferably selected to pass half the symbol rate of the APol-DPSK signal down-converted to the lower frequency range determined by the frequency of the LO 645 ($f_{LO}$). In other words, the detection bandwidth passband should pass R/2–$f_{LO}$, and it may or may not be centered about R/2–$f_{LO}$. Thus, by way of example, for a symbol rate of 42.7 Gb/s and an LO frequency of 20 GHz, the down-converted half symbol rate will be 42.7/2–20=1.35 GHz. A detection passband spanning 1.0 GHz to 4.4 GHz would be appropriate for such an embodiment.

As in the case of the embodiment of FIG. 1, the various components of the embodiment of FIG. 6 can be implemented in known ways. Moreover, the above discussion relating to the selection of the DLI delay also applies to the embodiment of FIG. 6.

Use of a feedback signal generator in accordance with various embodiments of the present invention does not require a polarization scrambler at the transmitter, which reduces the cost of the PMDC and also makes it easier for real system implementation. In addition, as the generation of the feedback signal in accordance with embodiments of the present invention does not require determining the RF power over the multiple SOPs generated by the polarization scrambler, the speed of PMD compensation for APol-DPSK signals can be significantly increased.

Beside the speed achievable with embodiments in accordance with the principals of the present invention, another advantage enabled is that PMD can be compensated regardless of the operating state of the receiver or whether it is synchronized. Other feedback arrangements (e.g., such as BER or eye opening) are too slow to track fast PMD changes and can only be used after the receiver is up and running, which is a fundamental issue for system implementation.

Embodiments of the present invention thus address the poor PMD performance typically associated with the APol-RZ-DPSK modulation format in a cost-effective manner by not requiring changes to the design of existing transmitters and receivers and allows in-service upgrade of existing DWDM systems loaded with 10 Gb/s channels to 40 Gb/s channels.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. A method of generating a feedback signal for polarization mode dispersion (PMD) compensation of an optical Alternate-Polarization Differential-Phase-Shift-Keying (APol-DPSK) signal comprising:
    demodulating the APol-DPSK signal with a delay-line-interferometer (DLI), the DLI having a free spectral range (FSR) that is different than a symbol rate of the APol-DPSK signal;
    detecting the demodulated APol-DPSK signal to generate a corresponding electrical signal;
    bandpass filtering the corresponding electrical signal, the bandpass filtering having a passband including half the symbol rate of the corresponding electrical signal;
    generating a PMD compensation feedback signal based on a power of the filtered corresponding electrical signal, whereby the power of the filtered corresponding electrical signal is indicative of the PMD in the APol-DPSK signal.

2. The method of claim 1, wherein a delay (D) of the DLI and a symbol period (Ts) of the APol-DPSK signal have the following relationship:

0.5 Ts<D<1.0 Ts, or 1.0 Ts<D<1.5 Ts.

3. The method of claim 2, wherein D is approximately 0.85 Ts or 1.15 Ts.

4. The method of claim 1, wherein the PMD is characterized by a differential group delay (DGD) of approximately 1.0 Ts or less.

5. The method of claim 1, wherein the bandpass filtering has a bandwidth selected so that the power of the filtered corresponding electrical signal is substantially independent of a state of polarization (SOP) of the APol-DPSK signal.

6. The method of claim 1, wherein the APol-DPSK signal has a symbol rate of approximately 42.7 GHz and the bandpass filtering has a bandwidth of approximately 3.4 GHz.

7. The method of claim 1 comprising:
    down-converting the corresponding electrical signal before it is bandpass filtered, wherein the passband of the bandpass filtering includes half the symbol rate of the down-converted corresponding electrical signal.

8. An apparatus for generating a feedback signal for polarization mode dispersion (PMD) compensation of an optical Alternate-Polarization Differential-Phase-Shift-Keying (APol-DPSK) signal comprising:
- a delay-line-interferometer (DLI), the DLI having a free spectral range (FSR) that is different than a symbol rate of the APol-DPSK signal;
- a detector coupled to an output of the DLI, the detector detecting the demodulated APol-DPSK signal to generate a corresponding electrical signal;
- a bandpass filtering means for filtering the corresponding electrical signal, the bandpass filtering means having a passband including half the symbol rate of the corresponding electrical signal; and
- a power detector for generating a PMD compensation feedback signal based on a power of the filtered corresponding electrical signal, whereby the power of the filtered corresponding electrical signal is representative of the PMD in the APol-DPSK signal.

9. The apparatus of claim 8, wherein the power detector includes the bandpass filtering means.

10. The apparatus of claim 8, wherein a delay (D) of the DLI and a symbol period (Ts) of the APol-DPSK signal have the following relationship:

$0.5\ Ts < D < 1.0\ Ts$, or $1.0\ Ts < D < 1.5\ Ts$.

11. The apparatus of claim 10, wherein D is approximately 0.85 Ts or 1.15 Ts.

12. The apparatus of claim 8, wherein the PMD is characterized by a differential group delay (DGD) of approximately 1.0 Ts or less.

13. The apparatus of claim 8, wherein the bandpass filtering means has a bandwidth selected so that the power of the filtered corresponding electrical signal is substantially independent of a state of polarization (SOP) of the APol-DPSK signal.

14. The apparatus of claim 8, wherein the APol-DPSK signal has a symbol rate of approximately 42.7 GHz and the bandpass filter has a bandwidth of approximately 3.4 GHz.

15. The apparatus of claim 8 comprising:
- a down-converter for down-converting the corresponding electrical signal before it is bandpass filtered, wherein the passband of the bandpass filtering means includes half the symbol rate of the down-converted corresponding electrical signal.

16. The apparatus of claim 8 comprising:
- a PMD compensator for PMD compensating the APol-DPSK signal in accordance with the PMD compensation feedback signal.

17. The apparatus of claim 16 comprising:
- a receiver for receiving the PMD compensated APol-DPSK signal.

* * * * *